United States Patent
Wu

(10) Patent No.: US 6,366,551 B1
(45) Date of Patent: Apr. 2, 2002

(54) TILT ANGLE ADJUSTING MECHANISM FOR OPTICAL DISC DRIVER

(75) Inventor: Tsung-Hung Wu, Yong Kang (TW)

(73) Assignee: Acute Applied Technologies, Inc., Hsinchu (TW)

( * ) Notice: Subject to any disclaimer, the term of this patent is extended or adjusted under 35 U.S.C. 154(b) by 0 days.

(21) Appl. No.: 09/535,466

(22) Filed: Mar. 23, 2000

(51) Int. Cl.[7] ............................ G11B 17/30; G11B 21/02
(52) U.S. Cl. ...................... 369/219; 369/215; 369/249
(58) Field of Search ............................. 369/219, 215, 369/249

(56) References Cited

U.S. PATENT DOCUMENTS

| | | | | | |
|---|---|---|---|---|---|
| 5,111,088 A | * | 5/1992 | Fujino | ........................ | 310/12 |
| 5,375,115 A | * | 12/1994 | Shimegi et al. | ............. | 369/244 |
| 5,761,182 A | * | 6/1998 | Jeon | ............................ | 369/219 |
| 5,764,618 A | * | 6/1998 | Kim | ............................ | 369/219 |
| 5,768,248 A | * | 6/1998 | Lee | ............................. | 369/219 |
| 5,933,406 A | * | 8/1999 | Ikegame | ..................... | 369/247 |
| 5,982,735 A | * | 11/1999 | Tsai | ........................ | 369/219 |
| 5,995,478 A | * | 11/1999 | Park | ........................... | 369/219 |
| 6,192,023 B1 | * | 2/2001 | Seo | ............................. | 369/219 |
| 6,285,649 B1 | * | 9/2001 | Bessho et al. | .............. | 369/219 |

* cited by examiner

Primary Examiner—David Davis
(74) Attorney, Agent, or Firm—W. Wayne Liauh

(57) ABSTRACT

The present invention provides a tilt angle adjusting mechanism for adjusting the tilt angle of the optical axis of a pickup head relative to the optical disc. The tilt angle adjusting mechanism includes two guide rods supported by a fixed holder and an adjusting holder. The adjusting holder receives an adjusting element for adjusting the guide rod moving toward or away from the optical disc. By adjusting one or both adjusting elements to move the guide rods in different axes, the correct tilt angle can be attained.

18 Claims, 3 Drawing Sheets

TILT ANGLE ADJUSTING MECHANISM FOR OPTICAL DISC DRIVER

BACKGROUND OF THE INVENTION

The present invention generally relates to mechanism for an optical disc driver, and more particularly to a tilt angle adjusting mechanism for adjusting a tilt angle of an optical axis of the pickup head relative to the optical disc.

The drivers for optical disc become more and more popular, and even indispensable in the current information industry. For example, drivers for reading CD-ROM or DVD ROM has now been well matured.

Please refer to FIGS. 1A and 1B which are the front and side views of a general optical disc driver. The optical disc driver includes a spindle motor 10, an optical pickup head 30 and a mecha chassis 20. The spindle motor 10 is fixed on an unshown motor base which is further fixed to the well-planed mecha chassis 20. An objective lens 31 is positioned on the optical pickup head 30 which is movably mounted on two guide rods 40a and 40b. The guide rods 40a, 40b are fixed to the mecha chassis 20 via holders 50a, 50b. The paralleling and positioning of the guide rods 40a, 40b are determined by the precision and positioning of the holders 50a, 50b and the mecha chassis 20.

The spindle motor 10 in the optical disc driver has to be precisely positioned in order to keep the data bearing surface of the optical disc, e.g., CD or DVD, perpendicular to the optical axis of the objective lens 31 in the optical pickup head 30, so that the information data can be correctly read. Generally, the tilt angle of the spindle motor 10 relative to the optical pickup head 30 or the guide rods 40a, 40b has to be well adjusted for the right positioning. The conventional tilt angle adjusting mechanisms can be classified into two kinds:

1) by adjusting the spindle motor 10. In this manner, the adjusting mechanism which piles on the spindle motor will occupy a certain space, easily pierce holes on the circuit board, increase the complexity of mechanical design, increase the difficulty of adjustment, and restrain a compact design of the optical disc driver;

2) by adjusting the guide rods 40a, 40b. This manner will cause the transmission mechanism of the optical pickup head 30 fail when the pickup head is driven via a gear-rack transmission.

SUMMARY OF THE INVENTION

The present invention provides a tilt angle adjusting mechanism for adjusting a tilt angle of an optical axis of a pickup head relative to the optical disc. The mechanism can easily adjust the guide rods to well position the optical axis of the pickup head so that the data stored on the optical disc can be correctly read by a laser beam.

In an optical disc driver having a spindle motor fixed on a chassis for carrying an optical disc to be read, and an optical pickup head including a laser beam for reading data from the optical disc, the tilt angle adjusting mechanism according to the present invention, for adjusting the optical axis of the pickup head perpendicular to the plane of the optical disc, includes:

a first and a second guide rods, parallel to each other, for carrying the optical pickup head, each of which includes a rotation prevention end and an adjusting end;

an adjusting element, connected to the adjusting end of the guide rod, for generating an axial movement along the axis of the guide rod; and a fixed holder and an adjusting holder for supporting the guide rod. The holders are fixed on the mecha chassis for respectively supporting the two ends of the guide rod. The adjusting holder receives the adjusting element for adjusting the guide rod moving toward or away from the optical disc. The fixed holder is furnished with a slot for tightly receiving the rotation prevention end of the guide rod so as to prevent the rod from rotation during adjustment.

A pressing element for providing a pressure to tightly fix the adjusting element to the adjusting holder.

The mecha chassis can be defined as an X-Y plane with an X axis where the guide rods extend, and a Y axis perpendicular to the X axis. When adjusting the tilt angle of the optical axis of the pickup head, we may first adjust the adjusting element of the second guide rod to move the second guide rod toward or away from the optical disc, so as to rotate the optical axis on the X axis based on the first guide rod. Or, we may adjust both adjusting elements of the first and second guide rods to move the adjusting ends of the rods and make the rods rotate on the Y axis. By adjusting the aforesaid X or Y axis rotation, a suitable tilt angle can be attained.

BRIEF DESCRIPTION OF THE DRAWINGS

The above objects and advantages of the present invention will become more apparent from the following detailed description of the present invention when taken in conjunction with the accompanying drawings.

DETAILED DESCRIPTION OF PREFERRED EMBODIMENTS

The present invention provides a tilt angle adjusting mechanism for an optical disc driver. The mechanism can easily adjust the guide rods of a pickup head to well position the optical axis of the pickup head relatively to the optical disc so that the data stored on the optical disc can be correctly read by a laser beam.

Figure 1A:
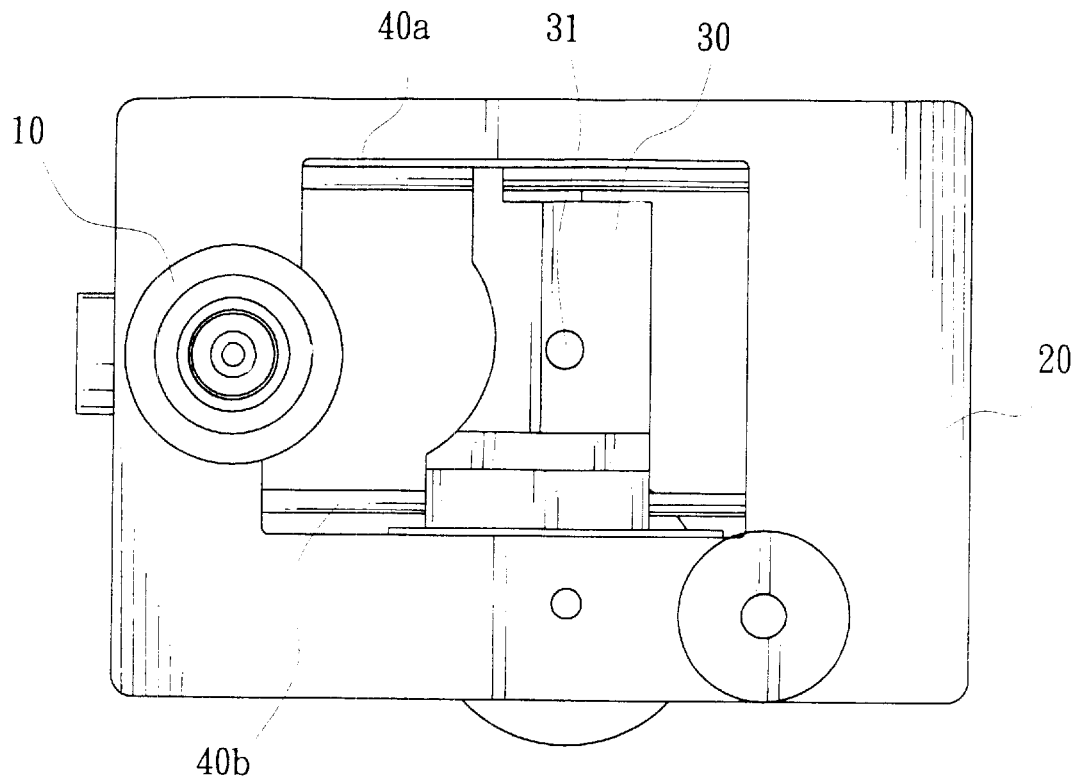
FIG. 1A is a front view of a general optical disc driver.
Figure 2A:
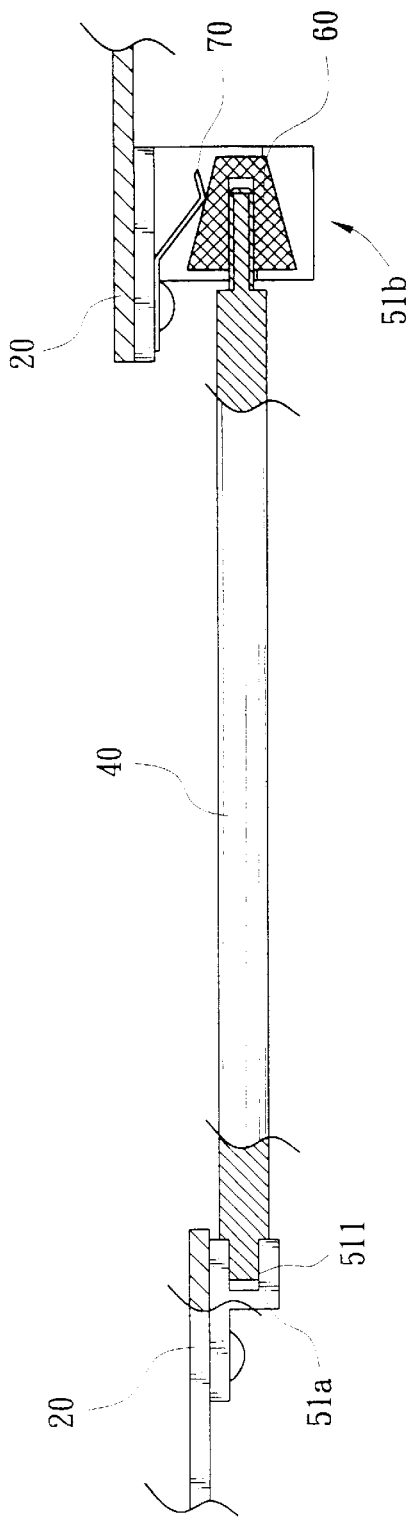
FIG. 2A is a partial sectional view of a tilt angle adjusting mechanism of an optical disc driver according to the present invention.
Figure 2C:
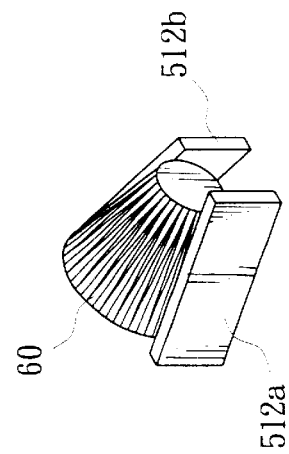
FIG. 2C is a perspective view of an adjusting holder shown in FIG. 2A.
Figure 2B:
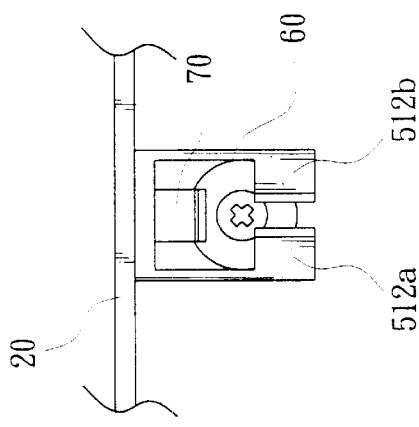
FIG. 2B is a side view of the tilt angle adjusting mechanism of FIG. 2A.

As shown in FIGS. 2A and 2B, a tilt angle adjusting mechanism according to the present invention is mainly incorporated on ends of the guide rod 40. A perspective view of an adjusting holder for holding one end of the guide rod 40 is also illustrated in FIG. 2C. We may also refer to FIG. 1A, the optical disc driver has a spindle motor 10 fixed on a mecha chassis 20 for carrying an optical disc (unshown) to be read, and an optical pickup head 30 providing a laser beam through an objective lens 31 for reading data from the optical disc. The tilt angle adjusting mechanism for adjusting the optical axis of the pickup head 30 perpendicular to the plane of the optical disc, includes:

a first and a second guide rods 40, parallel to each other, for carrying the optical pickup head 30; each of the guide rod 40 includes a rotation prevention end and an adjusting end. The adjusting end is furnished with a screw to be engaged with an adjusting element;

an adjusting element 60, such as a nut with a cone shape body, connected to the adjusting end of the guide rod 40, for generating an axial movement along the axis of the guide rod 40 when the nut is rotated;

a fixed holder 51*a* and an adjusting holder 51*b* for supporting the guide rod 40. The holders 51*a*, 51*b* are fixed on the mecha chassis 20 for respectively supporting the two ends of the guide rod 40. The adjusting holder 51*b* is furnished with cone supporters 512*a*, 512*b* for receiving the adjusting element 60 and adjusting the guide rod 40 moving toward or away from the optical disc so as to adjust the tilt angle of the optical pickup head 30. The fixed holder 51*a* is furnished with a slot 511 for tightly receiving the rotation prevention end of the guide rod 40 so as to prevent the rod 40 from rotation during adjustment of the element 60; and a pressing element 70, such as a preloaded spring for providing a pressure to tightly fix the adjusting element 60 to the adjusting holder 51*a*.

Figure 3:
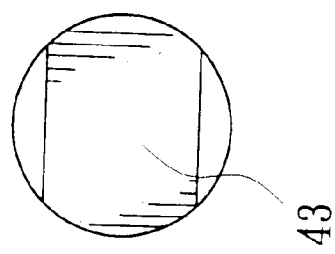
FIG. 3 is a profile of a rotation prevention end of a guide rod in a first embodiment of the present invention.

Referring now to FIG. 3, a profile of a rotation prevention end 41 of a guide rod 40 in a first embodiment of the present invention is shown. The rotation prevention end 41 fitting in the fixed holder 51*a* (see FIG. 2A) is furnished with a flat surface to be engaged with the slot 511 of the fixed holder 51*a*, so that the guide rod 40 is prevented from rotation during the tilt angle adjustment, and the guide rod 40 can be moved toward or away from the optical disc when the adjusting element 60 is rotated.

Figure 4:
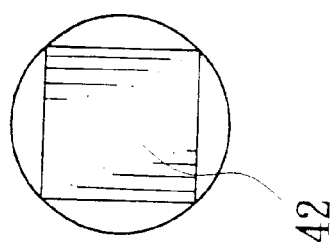
FIG. 4 is a profile of a rotation prevention end of a guide rod in a second embodiment of the present invention.

Referring now to FIG. 4, a profile of a rotation prevention end 42 of a guide rod 40 in a second embodiment of the present invention is shown. The rotation prevention end 42 fitting in the fixed holder 51*a* is furnished with a square portion to be engaged with the slot 511 of the fixed holder 51*a*, so that the guide rod 40 is prevented from rotation during the tilt angle adjustment, and attains the same function as that of the aforesaid first embodiment of FIG. 3.

Figure 5:
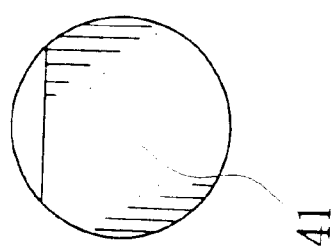
FIG. 5 is a profile of a rotation prevention end of a guide rod in a third embodiment of the present invention.

Referring further to FIG. 5, a profile of a rotation prevention end 43 of a guide rod 40 in a third embodiment of the present invention is shown. The rotation prevention end 43 fitting in the fixed holder 51*a* is furnished with two parallel surfaces to be engaged with the slot 511 of the fixed holder 51*a*, so that the guide rod 40 is prevented from rotation during the tilt angle adjustment, and attains the same functions as that of the aforesaid first and second embodiments of FIGS. 3 and 4.

Figure 1B:
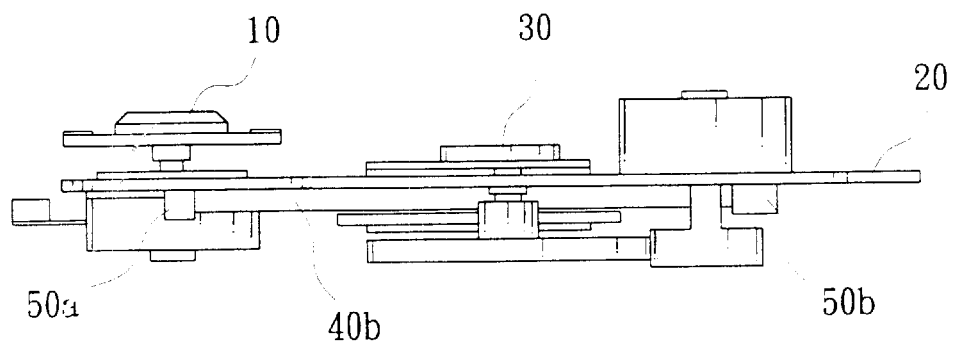
FIG. 1B is a side view of the optical disc driver of FIG. 1A.

Also referring to FIG. 1, the mecha chassis 20 can be defined as an X-Y plane with an X axis where the guide rods 40*a*, 40*b* extend, and a Y axis perpendicular to the X axis. When adjusting the tilt angle of the optical axis of the pickup head 30, we may first adjust the adjusting element 60 of the second guide rod 40*b* to move the second guide rod 40*b* toward or away from the optical disc, so as to rotate the optical axis on the X axis based on the first guide rod 40*a*. Or, we may adjust both adjusting elements 60 of the first and second guide rods 40*a*, 40*b* to move the adjusting ends of the rods 40*a*, 40*b* and make the rods rotate on the Y axis. By adjusting the aforesaid X or Y axis rotation, a suitable tilt angle can be attained.

The tilt angle adjusting mechanism for an optical disc driver according to the present invention has the following advantages:

a) by using the guide rods to adjust the tilt angle, the transmission of the pickup head can be well suited as the mecha chassis and related components are made in a common precision level;

b) no excessive space is needed for the adjusting mechanism, rather than the common adjusting mechanism which increases a further height on the spindle motor; and c) all manufacturing tolerances of the related components can be compensated by the tilt angle adjusting mechanism.

While the invention has been described in its preferred embodiments, it is to be understood that the words which have been used are words of description rather than limitation and that changes within the purview of the appended claims may be made without departing from the true scope and spirit of the invention.

What is claimed is:

1. In an optical disc driver having a spindle motor fixed on a chasis for carrying an optical disc to be read, and an optical pickup head including a laser beam for reading data from the optical disc, a tilt angle adjusting mechanism for adjusting an optical axis of the pickup head perpendicular to the plane of the optical disc, comprising:

a first and a second guide rods, parallel to each other, for carrying the optical pickup head, each of the guide rods includes a rotation prevention end and an adjusting end;

an adjusting element, connected to a longitudinal adjusting end of the guide rod, for generating an axial movement along the axis of each of the guide rods; and a fixed holder and an adjusting holder for supporting the guide rod, being fixed on the chassis for respectively supporting the two ends of each of the guide rods, wherein the adjusting holder receives the adjusting element for adjusting each of the guide rods moving toward or away from the optical disc, and the fixed holder is furnished with a slot for tightly receiving the rotation prevention end of each of the guide rods so as to prevent the rods from rotation during adjustment.

2. A tilt angle adjusting mechanism for adjusting the optical axis of the pickup head as recited in claim 1 wherein the rotation prevention end fitting in the fixed holder is furnished with a flat surface to be engaged with the slot of the fixed holder.

3. A tilt angle adjusting mechanism for adjusting the optical axis of the pickup head as recited in claim 1 wherein the rotation prevention end fitting in the fixed holder is furnished with a square portion to be engaged with the slot of the fixed holder.

4. A tilt angle adjusting mechanism for adjusting the optical axis of the pickup head as recited in claim 1 wherein the rotation prevention end fitting in the fixed holder is furnished with two parallel surfaces to be engaged with the slot of the fixed holder.

5. A tilt angle adjusting mechanism for adjusting the optical axis of the pickup head as recited in claim 1 wherein the adjusting end of the guide rod is furnished with a screw.

6. A tilt angle adjusting mechanism for adjusting the optical axis of the pickup head as recited in claim 1 wherein a pressing element is mounted for providing a pressure to tightly fix the adjusting element to the adjusting holder.

7. A tilt angle adjusting mechanism for adjusting the optical axis of the pickup head as recited in claim 6 wherein the pressing element is a spring.

8. A tilt angle adjusting mechanism for adjusting the optical axis of the pickup head as recited in claim 1 wherein the adjusting element is a nut.

9. A tilt angle adjusting mechanism for adjusting the optical axis of the pickup head as recited in claim 8 wherein the adjusting nut is formed with a cone shape body to contact with a supporter of the adjusting holder so as to adjust each of the guide rods moving toward or away from the optical disc when the nut is rotated.

10. An optical disc driver having a spindle motor fixed on a chassis for carrying an optical disc to be read, and an optical pickup head including a laser beam for reading data from the optical disc, comprising:

a tilt angle adjusting mechanism for adjusting an optical axis of the pickup head perpendicular to the plane of the optical disc; the tilt angle adjusting mechanism comprises:

a first and a second guide rods, parallel to each other, for carrying the optical pickup head; each of the guide rods includes a rotation prevention end and an adjusting end;

an adjusting element, connected to the adjusting end of the guide rod, for generating an axial movement along a longitudinal axis of the guide rod; and a fixed holder and an adjusting holder for supporting each of the guide rods. The holders are fixed on the chassis for respectively supporting the two ends of the guide rod, wherein the adjusting holder receives the adjusting element for adjusting each of the guide rods moving toward or away from the optical disc, and the fixed holder is furnished with a slot for tightly receiving the rotation prevention end of each of the guide rods so as to prevent the rods from rotation during adjustment.

11. An optical disc driver having a tilt angle adjusting mechanism as recited in claim 10 wherein the rotation prevention end fitting in the fixed holder is furnished with a flat surface to be engaged with the slot of the fixed holder.

12. An optical disc driver having a tilt angle adjusting mechanism as recited in claim 10 wherein the rotation prevention end fitting in the fixed holder is furnished with a square portion to be engaged with the slot of the fixed holder.

13. An optical disc driver having a tilt angle adjusting mechanism as recited in claim 10 wherein the rotation prevention end fitting in the fixed holder is furnished with two parallel surfaces to be engaged with the slot of the fixed holder.

14. An optical disc driver having a tilt angle adjusting mechanism as recited in claim 10 wherein the adjusting end of the guide rod is furnished with a screw.

15. An optical disc driver having a tilt angle adjusting mechanism as recited in claim 10 wherein a pressing element is mounted for providing a pressure to tightly fix the adjusting element to the adjusting holder.

16. An optical disc driver having a tilt angle adjusting mechanism as recited in claim 10 wherein the pressing element is a spring.

17. An optical disc driver having a tilt angle adjusting mechanism as recited in claim 10 wherein the adjusting element is a nut.

18. An optical disc driver having a tilt angle adjusting mechanism as recited in claim 17 wherein the adjusting nut is formed with a cone shape body to contact with a supporter of the adjusting holder so as to adjust the guide rod moving toward or away from the optical disc when the nut is rotated.

* * * * *